(12) United States Patent
Song et al.

(10) Patent No.: US 11,725,752 B2
(45) Date of Patent: Aug. 15, 2023

(54) MALE CONNECTOR HOLDER FOR AUTOMATIC CHEMICAL SUPPLY APPARATUS

(71) Applicant: STI CO., LTD., Anseong-si (KR)

(72) Inventors: Yong Ik Song, Anseong-si (KR); Hee Bong Chae, Anseong-si (KR); Jin Woo Lee, Anseong-si (KR); Hyung Kyu Seo, Pyeongtaek-si (KR); Jae Won Lee, Pyeongtaek-si (KR); Hyun Soo Jang, Pyeongtaek-si (KR)

(73) Assignee: STI CO., LTD., Anseong-si (KR)

(*) Notice: Subject to any disclaimer, the term of this patent is extended or adjusted under 35 U.S.C. 154(b) by 24 days.

(21) Appl. No.: 17/528,746

(22) Filed: Nov. 17, 2021

(65) Prior Publication Data
US 2022/0228689 A1 Jul. 21, 2022

(30) Foreign Application Priority Data
Jan. 20, 2021 (KR) .......................... 10-2021-0007971

(51) Int. Cl.
*F16L 3/24* (2006.01)
*B67D 7/02* (2010.01)
*F16L 3/10* (2006.01)

(52) U.S. Cl.
CPC .............. *F16L 3/24* (2013.01); *B67D 7/0288* (2013.01); *F16L 3/1075* (2013.01); *F16L 2201/10* (2013.01)

(58) Field of Classification Search
CPC ....... F16L 3/24; F16L 3/1075; F16L 2201/10; F16L 3/20; F16L 3/18; F16L 3/205; F16L 3/2053; F16L 3/16; F16L 47/06; F16L 47/20; F16L 3/21; B67D 7/0288
USPC .......................................................... 248/74.1
See application file for complete search history.

(56) References Cited

U.S. PATENT DOCUMENTS

| | | | | |
|---|---|---|---|---|
| 3,999,784 A | * | 12/1976 | Kennedy, Jr. ......... | E02F 9/2275 248/65 |
| 10,059,011 B2 | * | 8/2018 | Burlot .................. | B25J 19/0025 |
| 2015/0328780 A1 | * | 11/2015 | Burlot .................. | B25J 19/0025 74/490.02 |
| 2018/0023757 A1 | * | 1/2018 | Baiera ................... | F16L 3/006 248/513 |
| 2021/0317946 A1 | * | 10/2021 | Becher .................. | F16M 11/04 |
| 2021/0407703 A1 | * | 12/2021 | Rouleau ............... | H01B 7/0045 |

FOREIGN PATENT DOCUMENTS

| | | |
|---|---|---|
| KR | 10-1572537 | 11/2015 |
| KR | 10-1779493 | 9/2017 |

* cited by examiner

*Primary Examiner* — Christopher Garft
(74) *Attorney, Agent, or Firm* — Kile Park Reed & Houtteman PLLC

(57) ABSTRACT

The present disclosure relates to a male connector holder for an automatic chemical supply apparatus, in which as an upper stage that is independently movable in a front-rear direction is provided on a lower stage that is moved in the front-rear direction by a transfer unit, and even when a male connector having a stretched neck region is seated on the holder, the automatic chemical supply apparatus may be smoothly and normally operated.

7 Claims, 6 Drawing Sheets

(a)   (b)

(a)

(b)

MALE CONNECTOR HOLDER FOR AUTOMATIC CHEMICAL SUPPLY APPARATUS

CROSS-REFERENCE TO RELATED APPLICATION

This application claims priority to and the benefit of Korean Patent Application No. 10-2021-0007971 filed on Jan. 20, 2021, the disclosure of which is incorporated herein by reference in its entirety.

BACKGROUND

1. Field of the Invention

The present disclosure relates to a male connector holder for an automatic chemical supply apparatus, and particularly, to a male connector holder for an automatic chemical supply apparatus using which, even when the shape of a male connector is deformed, the automatic chemical supply apparatus is smoothly and normally operated and, furthermore, which performs alignment to correct the shape of the deformed male connector.

2. Discussion of Related Art

In general, in all companies that use hazardous chemicals, such as companies that manufacture semiconductors, semiconductor devices, liquid crystal displays (LCDs), and organic light emitting diodes (OLEDs), pharmaceutical companies, and paint companies, various types of chemicals are used, and methods of safely supplying these chemicals are also diversified.

These chemicals are transferred from a chemical tank of a tank lorry stopped outside a building to a chemical storage tank installed inside the building and are then transferred from the chemical storage tank to a chamber in which a unit process is performed. Further, in contrast, chemicals may be transferred from a chemical storage tank to a tank lorry.

Currently, an automatic chemical supply apparatus called an automatic clean quick coupler (ACQC) unit has been released and is in use. Here, the chemical storage tank is generally provided inside the building, and the ACQC unit serves as a relay supplying between the chemical tank of the tank lorry located outside the building and the chemical storage tank located inside the building. In detail, the ACQC unit includes a chemical male connector holder and a chemical female connector and may allow a transfer unit to move the chemical male connector holder to the chemical female connector so that a chemical male connector is automatically inserted into and fastened to the female connector. Accordingly, the chemicals may be supplied safely while a worker is not exposed to the chemicals.

FIG. 1 is a view for describing a side surface of the ACQC unit according to the related art. FIG. 1 illustrates Korean Patent Publication No. 10-1779493 (Automatic chemical supply apparatus). As illustrated, the automatic chemical supply apparatus 1000 (ACQC unit) may include a male connector holder 100, a housing body 200, a transfer housing 300, a transfer unit 400, and a female connector 500.

One end of the transfer unit 400 may be inserted into an opening 601 formed in a wall body 600. The wall body 600 means a wall constituting a building, and the opening 601 is formed in a shape that is penetrated so that the outside and the inside of the building communicate with each other.

When the worker seats and fixes a male connector 20, to which a chemical hose 700 is connected, onto the male connector holder 100, the male connector holder 100 is moved forward by driving the transfer unit 400, and thus the male connector 20 is inserted into the female connector 500. The transfer unit 400 includes one or more transfer stages 410 and a driver, and thus the male connector holder 100 may slide forward/rearward on the transfer stages 410.

In general, a nitrogen hose 800 is also connected to the automatic chemical supply apparatus 1000 together with the chemical hose 700 and thus may accelerate the supply of the chemicals by pressurization by supplying nitrogen ($N_2$) to the tank lorry.

FIG. 2 shows views for describing cross sections of a male connector and peripheral components. FIG. 2(a) is a cross-sectional view for describing the male connector 20 having a normal shape, and FIG. 2(b) is a cross-sectional view for describing the male connector 20 having an abnormal shape of which a neck region is stretched. As illustrated in FIG. 2(a), the male connector 20 may be divided into a head region 20-1 of the male connector 20 inserted into the female connector 500 and a neck region 20-2 of the male connector 20 fastened by a flange (buffer flange). Further, a flange 30 is fastened to a hose flange 40 by a plurality of bolts and nuts, and the chemicals are discharged to the outside of the male connector 20 through the chemical hose 700 connected to a hose flange 40 and a nozzle of the male connector 20.

However, the neck region 20-2 of the male connector 20 is made of a Teflon material that is easily deformable, and since the neck region 20-2 is thinner than the head region 20-1, the neck region 20-2 may be shape-deformed due to prolonged use and a load.

For example, the head region 20-1 of the male connector 20 may be bent downward or upward, and as illustrated in FIG. 2(b), the neck region 20-2 of the male connector 20 may be stretched forward. In this way, other causes of the stretching of the neck region 20-2 of the male connector 20 include accumulation of repeated processes of fastening or separating the hose flange 40 and the flange 30, fastening with eccentricity on one side of upper, lower, left, and right sides, and fastening with a force that is too strong.

In the case of a normal male connector 20 of which the neck region 20-2 is not stretched, the flange 30 is spaced apart from the head region 20-1 by D. However, in the case of an abnormal male connector 20 of which the neck region 20-2 is stretched by d, as illustrated, the flange 30 is spaced apart from the head region 20-1 by D+d. A distance d may be in the range of 1 to 5 mm.

Even in the case of the abnormal male connector 20, the head region 20-1 of the male connector 20 may be completely inserted into and fastened to the female connector 500, and thus there is actually no problem in the supply of the chemicals. However, the automatic chemical supply apparatus 1000 may recognize that the head region 20-1 of the male connector 20 is not completely inserted into or fastened to the female connector 500. For example, in the case of the automatic chemical supply apparatus that is controlled so that, on the basis of the flange 30, when the flange 30 is moved forward to a specific location, the forward movement is detected, a current state is recognized, on the basis of the detected forward movement, as complete insertion or fastening between the male connector 20 and the female connector 500, and a subsequent process is then performed, when the flange 30 is prevented from moving further forward, the automatic chemical supply apparatus 1000 may not be operated normally. That is, in the case of FIG. 2(b), the flange 30 cannot move forward by the distance d, and thus it may be recognized that complete insertion or fastening is not made.

In this way, when the neck region 20-2 is stretched, the automatic chemical supply apparatus 1000 recognizes that the complete insertion or fastening has not been made and cannot proceed to a subsequent process because the male connector 20 continuously moves forward by the transfer unit 400 or the chemicals are not discharged.

Korean Patent Publication No. 10-1779493 (called "Automatic chemical supply apparatus") discloses a technology in which, as a male connector holder on which a male connector is seated moves forward or rearward on a stage, the male connector is fastened to a female connector or the male connector is separated from the female connector. However, a technology in which, even when a neck region is deformed, an automatic chemical supply apparatus is smoothly and normally operated is not disclosed.

SUMMARY OF THE INVENTION

The present disclosure is directed to providing a male connector holder using which an automatic chemical supply apparatus that is smoothly and normally operated even when the shape of a male connector is deformed and, furthermore, which accurately and precisely mounts the male connector and a female connector by performing alignment that corrects the shape of the deformed male connector.

One aspect of the present disclosure provides a male connector holder for an automatic chemical supply apparatus, in which, in order to supply a chemical between a chemical tank and a chemical storage tank connected to each other, a male connector is transferred in a front-rear direction by a transfer unit in a state in which a flange coupled to the male connector is seated so that the male connector and a female connector are connected to each other, the male connector holder including a lower stage moved in the front-rear direction by the transfer unit, an upper stage which is provided on the lower stage and on which the flange coupled to the male connector is seated, and a rail that extends in the front-rear direction and is provided between the lower stage and the upper stage, wherein the upper stage is moved in the front-rear direction along the rail on the lower stage.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2(a) is a cross-sectional view for describing the male connector 20 having a normal shape, and FIG. 2(b) is a cross-sectional view for describing the male connector 20 having an abnormal shape of which a neck region is stretched;

FIG. 3(a) is a perspective view, and FIG. 3(b) is a view for describing a side surface vertically taken along line X-X';

FIG. 4(a) is a view for describing the male connector holder 100 on which a normal male connector having a not-stretched neck region is seated, and FIG. 4(b) is a view for describing the male connector holder 100 on which an abnormal male connector having a stretched neck region is seated;

FIG. 5(a) is a view before the male connector is fastened to the female connector, and FIG. 5(b) is a view after the male connector is fastened to the female connector.

DETAILED DESCRIPTION OF EXEMPLARY EMBODIMENTS

Figure 1:
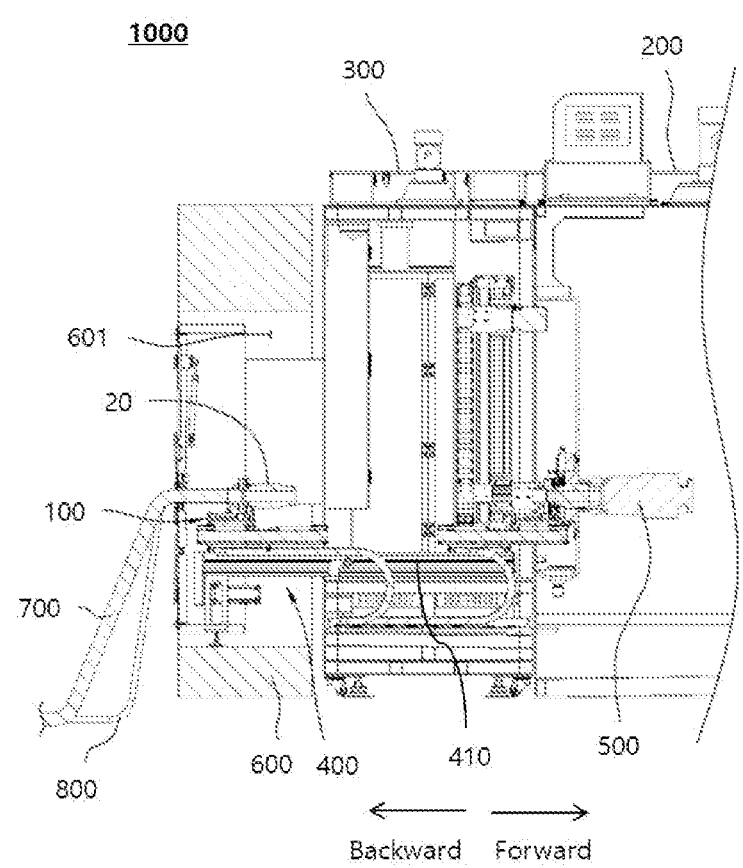
FIG. 1 is a view for describing a side surface of an automatic clean quick coupler (ACQC) unit according to a related art.

Hereinafter, the present disclosure will be described in detail so that those skilled in the art may easily understand and reproduce the present disclosure through exemplary embodiments described with reference to the accompanying drawings. In the description of the present disclosure, when it is determined that the detailed description of related widely known functions or configurations may make the subject of the embodiments of the present disclosure unclear, the detailed description will be omitted. Terms used throughout the present specification are terms defined in consideration of functions in the embodiments of the present disclosure, and since the terms may be sufficiently modified according to the intention, the custom, or the like of a user or operator, a definition of these terms should be made on the basis of the contents throughout the present specification.

Further, the above aspects and additional aspects of the disclosure will become apparent through the following embodiments. Although the aspects selectively described in the present specification or configuration of the embodiments selectively described in the present specification are illustrated as a single integrated component in the drawings, it is understood that, unless otherwise stated, the aspects and configurations may be combined with each other when it is not apparent to those skilled in the art that there is a technical contradiction.

Thus, since the embodiments described in the present specification and configurations illustrated in the drawings are merely the most exemplary embodiments of the present disclosure and do not represent all the technical spirit of the present disclosure, it should be understood that various equivalents and modifications that may replace the embodiments and the configurations are present at filling of the present application.

Figure 3:
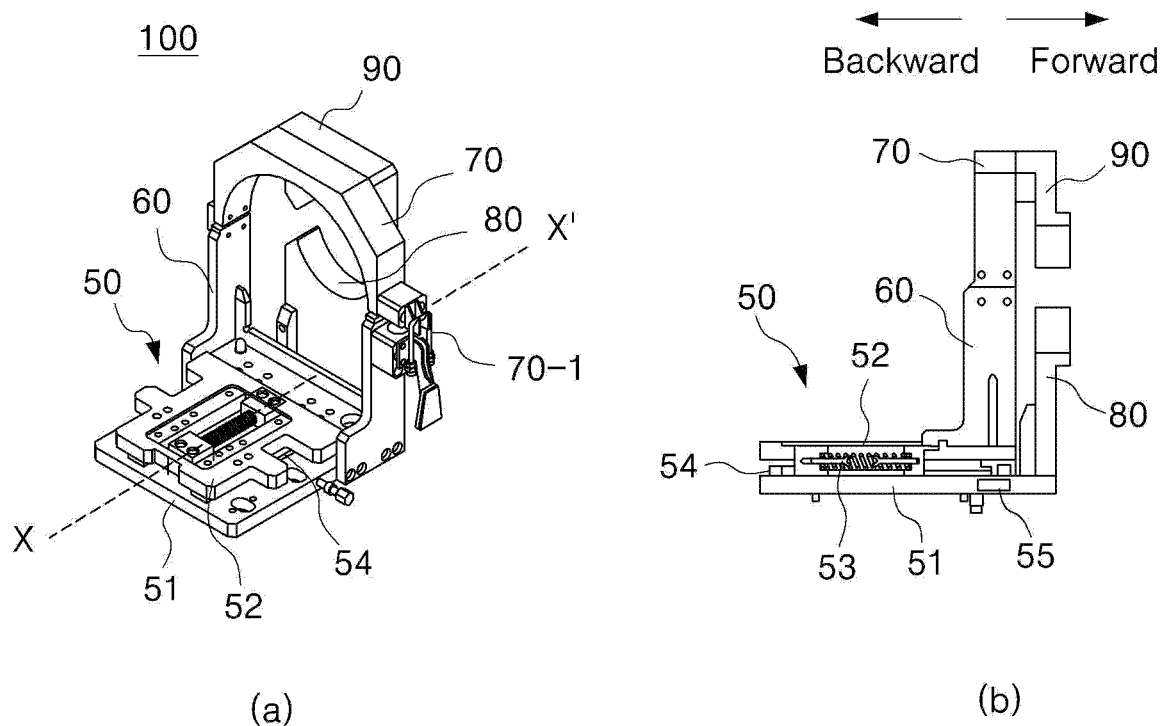
FIG. 3 shows views for describing a male connector holder of an automatic chemical supply apparatus according to one embodiment.

FIG. 3 shows views for describing a male connector holder of an automatic chemical supply apparatus according to one embodiment. FIG. 3(a) is a perspective view, and FIG. 3(b) is a view for describing a side surface vertically taken along line X-X'. As illustrated, a male connector holder 100 of an automatic chemical supply apparatus may include a stage 50, a lower clamping holder 60, an upper clamping holder 70, a lower support pad 80, and an upper support pad 90, and the stage 50 may include a lower stage 51, an upper stage 52, an elastic member 53, and a rail 54.

The lower stage 51 may be moved forward or rearward by a transfer unit 400 of FIG. 1. The lower stage 51 may have a quadrangular plate shape.

Figure 2:
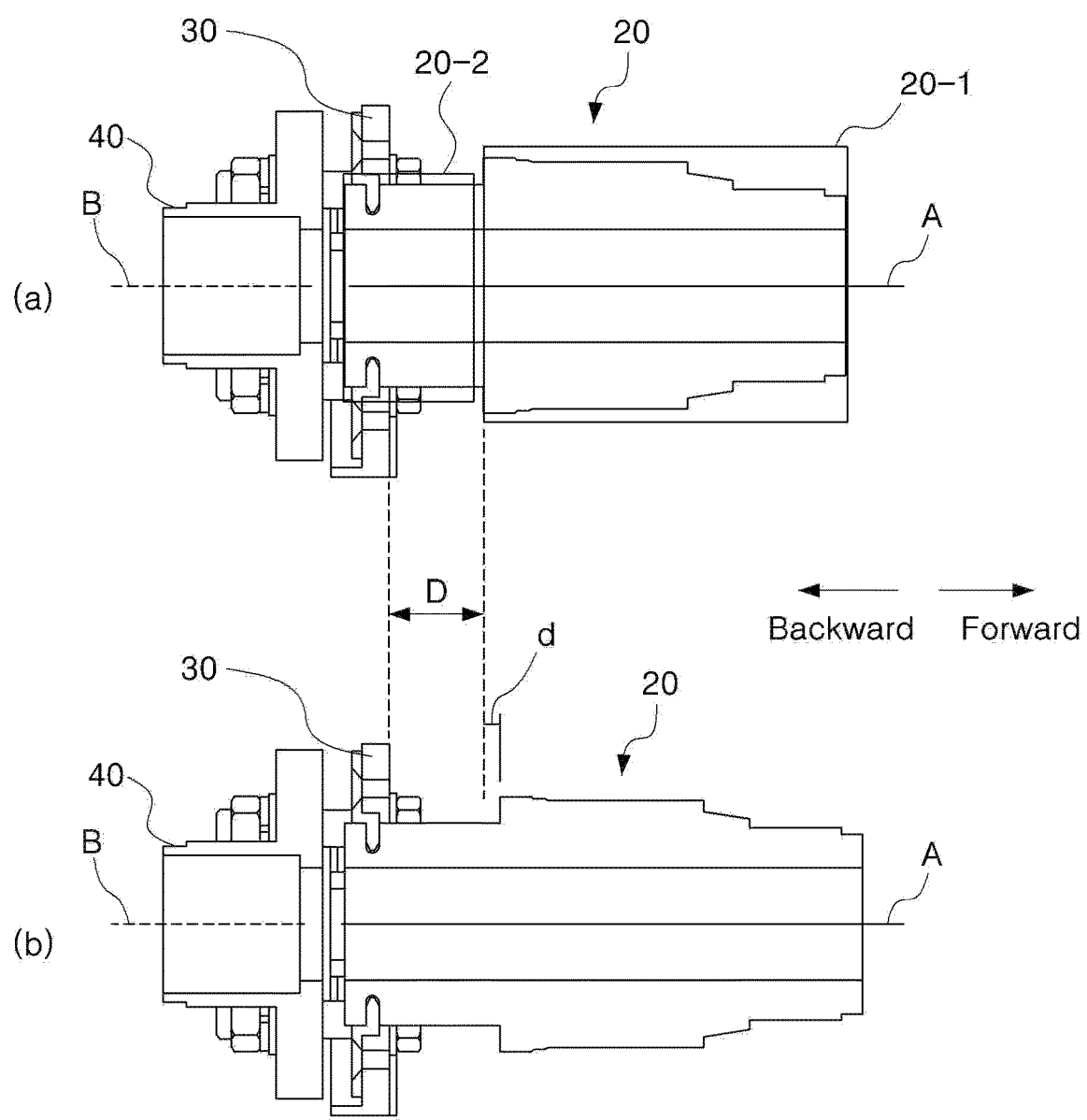
FIG. 2 shows views for describing cross sections of a male connector and peripheral components.

The upper stage 52 may be provided on the lower stage 51, and a flange 30 coupled to the male connector of FIG. 2 may be seated on the upper stage 52.

The elastic member 53 extends in a front-rear direction and is connected to the lower stage 51 and the upper stage 52. Since the elastic member 53 extends in the front-rear direction, the elastic member 53 may have an elastic force in the front-rear direction. The elastic member 53 may be a spring.

The rail 54 may extend in the front-rear direction and may be provided between the lower stage 51 and the upper stage 52. The rail 54 may be provided on the lower stage 51 and may be provided as a plurality of rails 54. A unit functioning as a movement guide is considered as being included in the rail 54.

Due to this configuration, the upper stage 52 may move in the front-rear direction along the rail 54 on the lower stage 51 and may have an elastic repulsive force due to the elastic member 53. Thus, the lower stage 51 may be moved further forward independently of the upper stage 52 due to compression of the elastic member 53, and the upper stage 52 pushed and moved rearward may be automatically moved forward and returns to an original location thereof.

The lower stage 51 may further include a location sensor 55 that provides location information of the lower stage 51 in the front-rear direction. The location sensor 55 may be an optical sensor and may be a light emitting unit or a light receiving unit, and the light emitting unit or the light receiving unit corresponding thereto may be separately provided in the automatic chemical supply apparatus. The type of the location sensors 55 is not limited.

The male connector holder 100 of the automatic chemical supply apparatus according to one embodiment may further include the lower clamping holder 60, the upper clamping holder 70, the lower support pad 80, and the upper support pad 90.

The lower clamping holder 60 may be provided on the lower stage 51. The lower clamping holder 60 may be fixed to both sides of the lower stage 51 and located on the lower stage 51.

The upper clamping holder 70 may be provided on the lower clamping holder 60. The upper clamping holder 70, of which one end is hinge-coupled to the other end of the lower clamping holder 60, may be rotated. As illustrated, a locking part 70-1 is provided in the upper clamping holder 70 and the lower clamping holder 60 and fixedly fastens the upper clamping holder 70 and the lower clamping holder 60 to each other.

The lower support pad 80 may be provided on the lower stage 51 and may be in contact with a neck region 20-2 of the male connector in an upper end thereof.

The upper support pad 90 may be provided on the lower support pad 80, may be provided on the upper clamping holder 70, and may come into contact with and press the neck region 20-2 of the male connector.

The neck region 20-2 of the male connector may be divided into a front neck region 20-2-1 of the male connector located on the front side and a rear neck region 20-2-2 of the male connector located on the rear side, and the lower support pad 80 and the upper support pad 90 may be in contact with each other in the front neck region 20-2-1 of the male connector.

Due to this structure, a central axis of the male connector 20 may be aligned with a central axis of the female connector. Thus, when the neck region 20-2 of the male connector is deformed and thus a head region 20-1 of the male connector is bent upward or downward, the deformation and the bending can be corrected due to this structure.

Figure 4:
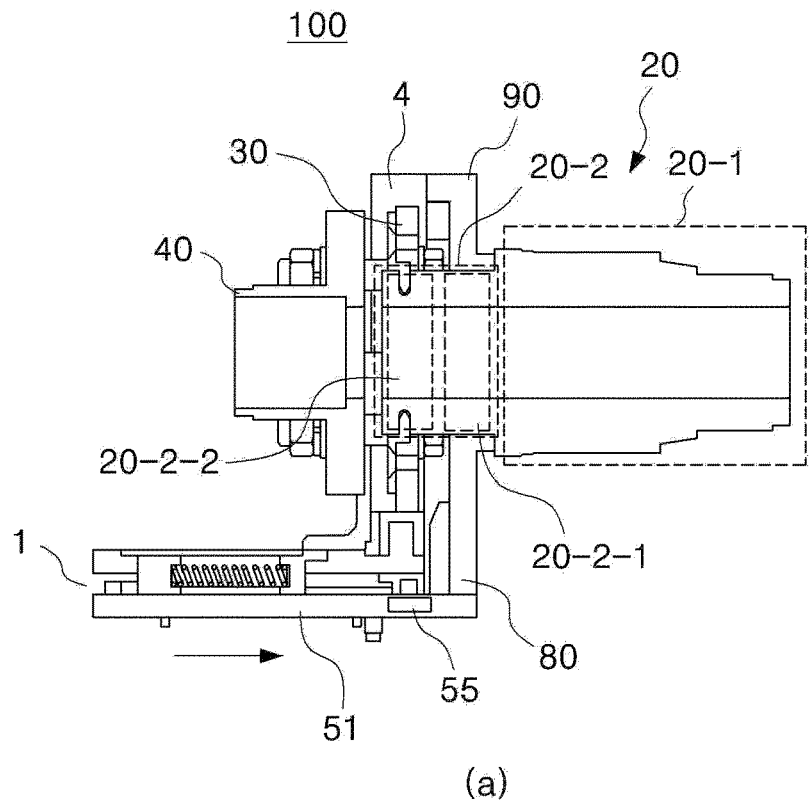
FIG. 4 shows views for describing a cutaway cross section of the male connector holder of the automatic chemical supply apparatus, on which the male connector is seated, according to one embodiment.
Figure 4:
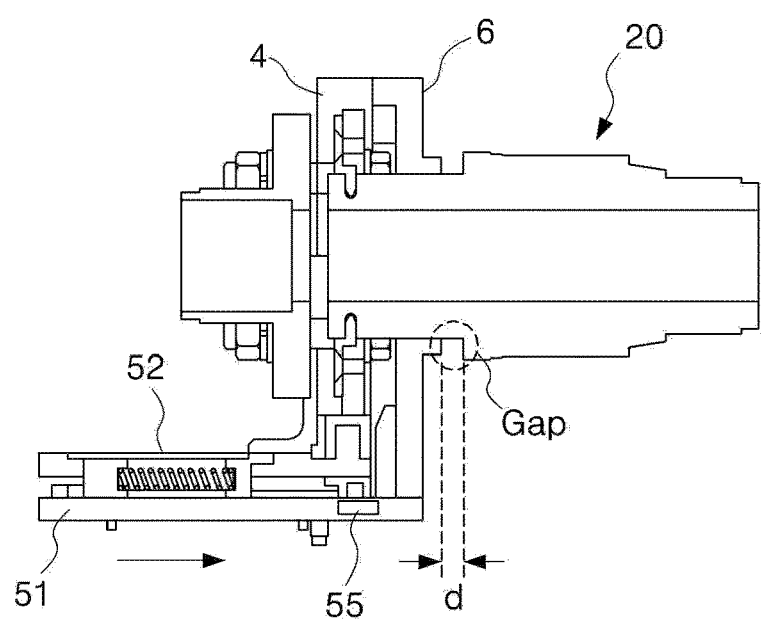

FIG. 4 shows views for describing a cutaway cross section of the male connector holder of the automatic chemical supply apparatus, on which the male connector is seated, according to one embodiment. FIG. 4(a) is a view for describing the male connector holder 100 on which a normal male connector having a not-stretched neck region is seated, and FIG. 4(b) is a view for describing the male connector holder 100 on which an abnormal male connector having a stretched neck region is seated. As illustrated in FIG. 4(a), since the male connector 20 having the not-stretched neck region 20-2 is seated on the male connector holder 100, the lower support pad 80 and the upper support pad 90 are pressed against the front neck region 20-2-1 of the male connector, and thus no gap is generated. Accordingly, the lower stage 51 is also sufficiently moved forward, the location information of the lower stage 51 in the front-rear direction may be provided through the location sensor 55, and thus it may be identified that the male connector and the female connector are normally fastened to each other. Thereafter, a following process such as stopping of driving of the transfer unit or discharging of a chemical by the automatic chemical supply apparatus is performed.

According to one embodiment, the location sensor 55 may be provided directly below the flange 30. Thus, by detecting a forward location of the flange 30, it may be identified whether or not the male connector and the female connector are normally fastened to each other. In case of FIG. 4(a), it is recognized that the lower stage 51 is moved forward to a normal location, and thus the male connector and the female connector are normally inserted into and fastened to each other.

Meanwhile, as illustrated in FIG. 4(b), since the male connector 20 having the neck region 20-2 stretched by a distance d is seated on the male connector holder 100, the lower support pad 80 and the upper support pad 90 are not pressed against the front neck region 20-2-1 of the male connector, and thus a gap corresponding to the distance d is generated. In this case, in the related art, the lower stage 51 is not sufficiently moved forward. Accordingly, the automatic chemical supply apparatus recognizes, through the location sensor 55, that the male connector and the female connector are not fastened or incompletely fastened to each other, and thus does not perform the next process.

However, in the present disclosure of FIG. 4, when the neck region 20-2 is stretched by the distance d, the lower stage 51 may be moved further forward by the distance d using the transfer unit independently of the upper stage 52, and thus the gap is not generated. Thus, the problems such as unfastening or incomplete fastening can be solved.

Figure 5:
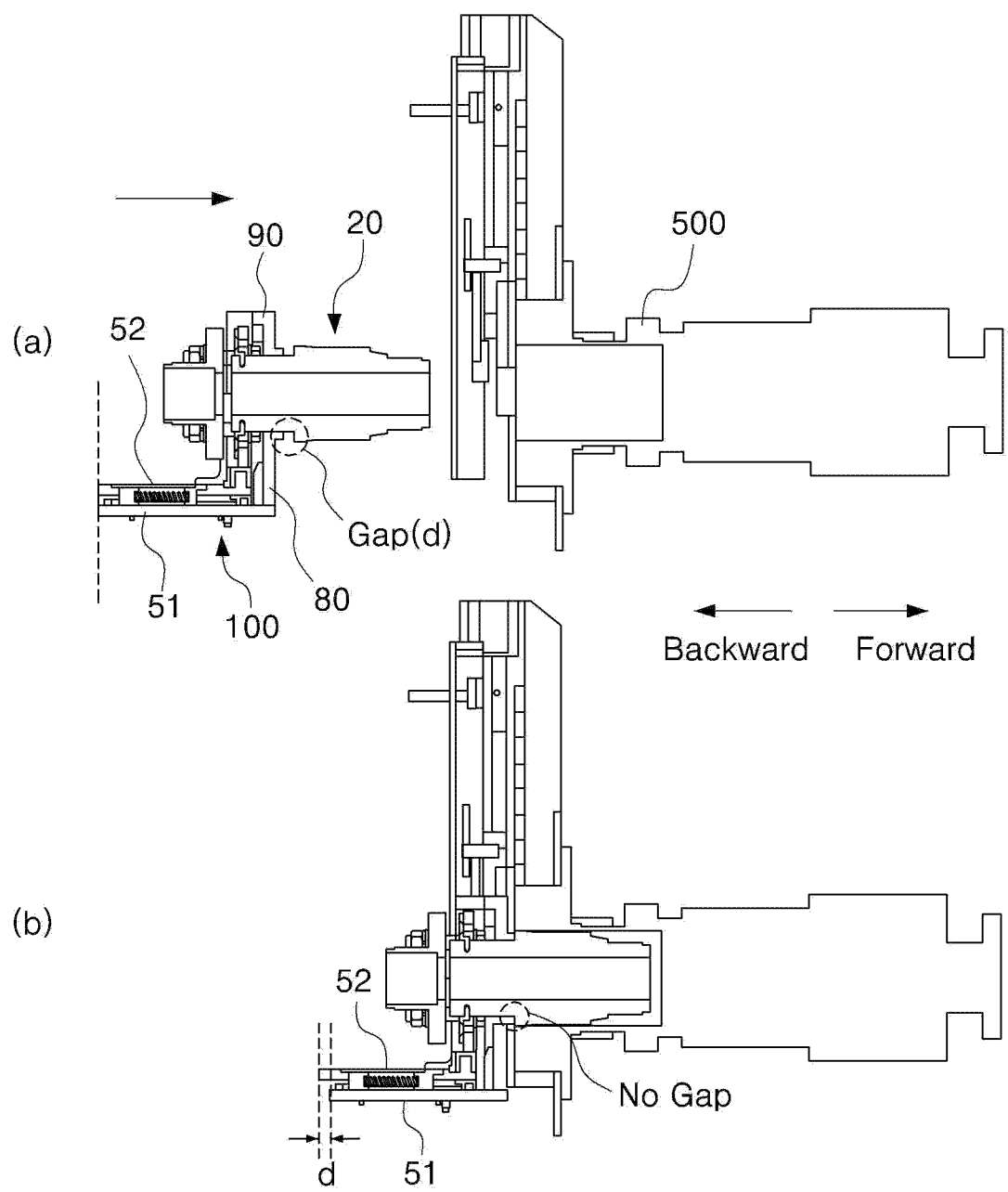
FIG. 5 shows views for describing a process in which a male connector having a stretched neck region is fastened to a female connector.

FIG. 5 shows views for describing a process in which a male connector having a stretched neck region is fastened to a female connector. FIG. 5(a) is a view before the male connector is fastened to the female connector, and FIG. 5(b) is a view after the male connector is fastened to the female connector. As illustrated in FIG. 5(a), the abnormal male connector 20 having the neck region stretched by the distance d is seated on the male connector holder 100, and thus the lower stage 51 cannot be moved further forward by d. Accordingly, the gap corresponding to the distance d is generated. However, as illustrated in FIG. 5(b), when the male connector 20 is inserted into and fastened to the female connector 500, the upper stage 52 may be pushed and moved backward by the distance d, the lower stage 51 may be moved further forward, and thus no gap is generated. Due to this structure of the present disclosure, although the male connector 20 is stretched by the distance d, the lower stage 51, furthermore, the support pads 80 and 90, may be moved further forward, and thus the automatic chemical supply apparatus recognizes that the normal male connector is seated on the male connector holder 100 and is thus completely fastened to the female connector. Thus, the automatic chemical supply apparatus may perform a next process such as the stopping of the driving of the transfer unit and the discharging of the chemical.

Figure 6:
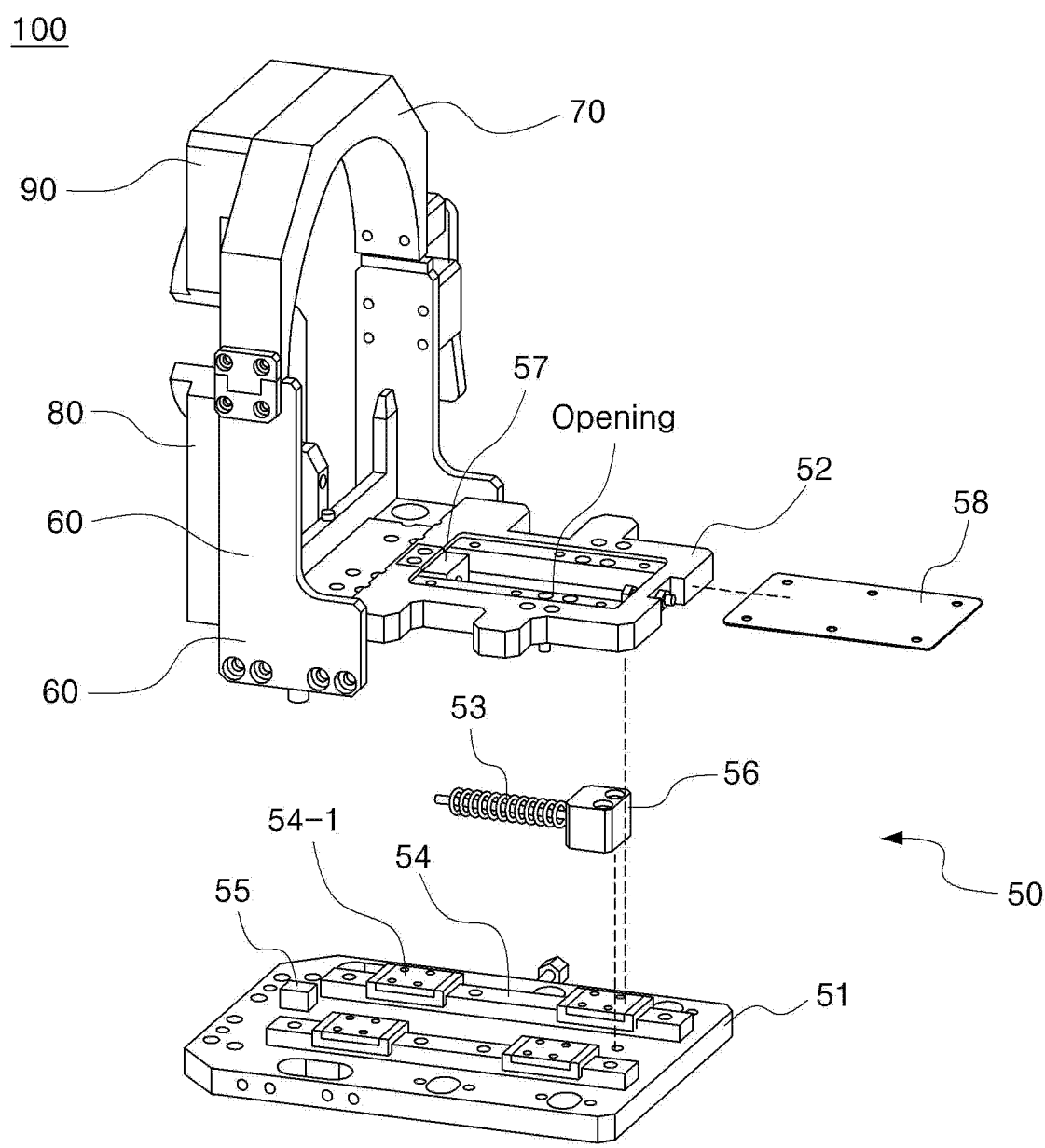
FIG. 6 is a view for describing a configuration of the male connector holder of the automatic chemical supply apparatus according to one embodiment.

FIG. 6 is a view for describing a configuration of the male connector holder of the automatic chemical supply apparatus according to one embodiment.

As illustrated, the male connector holder 100 of the automatic chemical supply apparatus may include the stage 50, the lower clamping holder 60, the upper clamping holder 70, the lower support pad 80, and the upper support pad 90, and further, the stage 50 may include the lower stage 51, the upper stage 52, the elastic member 53, the rail 54, the location sensor 55, a first connection member 56, and a second connection member 57.

The rail 54, the location sensor 55, and the first connection member 56 may be provided on the lower stage 51. The location sensor 55 may be located directly below the flange 30.

The upper stage 52 may be provided with an opening. The first connection member 56 may be provided at one end of the elastic member 53, may be fixed to the lower stage 51, and may connect the elastic member 53 and the lower stage 51 in the opening.

The locations of the first connection member 56 and the second connection member 57 may be freely determined.

The second connection member 57 may be provided at the other end of the elastic member 53, may be fixed to the upper stage 52, and may connect the elastic member 53 and the upper stage 52 in the opening.

According to an embodiment, the rail 54 may further include a movement bar 54-1 that is provided on the rail 54 and moves in the front-rear direction along the rail 54. The movement bar 54-1 and the upper stage 52 may be fixedly connected. Accordingly, the upper stage 52 may be moved in the front-rear direction along the rail 54 by the movement bar 54-1. A cover 58 may be provided on the opening. The cover 58 may be made of a transparent material. Accordingly, the forward and rearward movement of the first connection member 56 in the opening may be visually identified, and thus components are easily replaced.

According to the present disclosure, even when a male connector having a stretched neck region is seated on a holder, an automatic chemical supply apparatus can be smoothly and normally operated, and thus the chemical can be supplied without interruption.

Further, when a male connector having an upward or downward bent neck region is seated on the holder, alignment is performed by correction, and thus the male connector and a female connector can be accurately fastened.

Accordingly, ultimately, the productivity of supply of the chemical can be increased, and safety of a worker can be achieved.

What is claimed is:

1. A male connector holder for an automatic chemical supply apparatus, in which, in order to supply a chemical between a chemical tank and a chemical storage tank connected to each other, a male connector is transferred in a front-rear direction by a transfer unit in a state in which a flange coupled to the male connector is seated so that the male connector and a female connector are connected to each other, the male connector holder comprising:
   a lower stage moved in the front-rear direction by the transfer unit;
   an upper stage which is provided on the lower stage and on which the flange coupled to the male connector is seated; and
   a rail that extends in the front-rear direction and is provided between the lower stage and the upper stage,
   wherein the upper stage is moved in the front-rear direction along the rail on the lower stage, and
   wherein the lower stage includes a location sensor that provides location information of the lower stage in the front-rear direction.

2. The male connector holder of claim 1, further comprising an elastic member that extends in the front-rear direction and is connected to the lower stage and the upper stage.

3. The male connector holder of claim 1, further comprising a lower support pad that is provided on the lower stage and is in contact with a neck region of the male connector at an upper end thereof.

4. The male connector holder of claim 3, further comprising:
   a lower clamping holder provided on the lower stage;
   an upper clamping holder provided on the lower clamping holder; and
   an upper support pad that is provided on the lower support pad and is provided on the upper clamping holder to come into contact with and press the neck region of the male connector.

5. The male connector holder of claim 4, wherein the neck region of the male connector is divided into a front neck region of the male connector located on a front side and a rear neck region of the male connector located on a rear side, and
   the lower support pad and the upper support pad are in contact with the front neck region of the male connector.

6. The male connector holder of claim 1, wherein the upper stage has an opening and comprises:
   a first connection member that is provided at one end of an elastic member, is fixed to the lower stage, and connects the elastic member and the lower stage in the opening; and
   a second connection member that is provided at the other end of the elastic member, is fixed to the upper stage, and connects the elastic member and the upper stage in the opening.

7. The male connector holder of claim 1, wherein the rail further includes a movement bar that is provided on the rail and is moved in the front-rear direction along the rail, and the movement bar and the upper stage are fixedly connected to each other.

* * * * *